United States Patent [19]
Kartinen

[11] 3,810,347
[45] May 14, 1974

[54] CENTRIFUGAL SEPARATOR FOR THREE PHASE MIXTURE

[75] Inventor: Ernest Orval Kartinen, Long Beach, Calif.

[73] Assignee: Signal Oil and Gas Company, Long Beach, Calif.

[22] Filed: Jan. 16, 1973

[21] Appl. No.: 324,172

[52] U.S. Cl............ 55/45, 55/46, 55/52, 55/177, 55/203
[51] Int. Cl............................. B01d 19/00
[58] Field of Search........... 55/45, 46, 52, 177, 191, 55/203, 447, 449

[56] References Cited
UNITED STATES PATENTS

| | | | |
|---|---|---|---|
| 2,634,907 | 4/1953 | Smith | 44/203 X |
| 3,161,593 | 12/1964 | Schiel | 55/45 X |
| 2,507,797 | 5/1950 | Martin | 55/52 X |

*Primary Examiner*—Samih N. Zaharna
*Assistant Examiner*—Richard W. Burks
*Attorney, Agent, or Firm*—Donald W. Canady

[57] ABSTRACT

A centrifugal separator for separating a mixture of higher and lower density immiscible fluids with means for separating a third gaseous phase from said fluids is disclosed.

11 Claims, 5 Drawing Figures

CENTRIFUGAL SEPARATOR FOR THREE PHASE MIXTURE

BACKGROUND OF THE INVENTION

In many applications it is necessary to separate two immiscible fluid components from a mixture thereof. For example, an oil-water mixture is frequently produced in oil field and refinery operations, and the oil must be removed before the water can be reused or discharged into a public water source. Oil tanker ballast tanks frequently require removal of residual oil from the ballast water prior to discharge of the water into the ocean. In such operations, it is desirable to employ an efficient continuous separator capable of handling high volumes to effect such a separation.

DISCUSSION OF THE PRIOR ART

Centrifugal separators have heretofore been proposed for use in such applications, but have not been entirely satisfactory. Prior art centrifugal separators have been successful in effecting the separation of mixtures at widely varying inlet flow rates with varying proportions of the component fluids in the mixture. Such a separator is described in my copending joint application Ser. No. 175,886 filed on Aug. 30, 1971. It has been found, however, that the operation of such separators is impaired when the fluid mixture contains significant amounts of a dissolved gaseous component, since the gas tends to release in the initial flow paths of the separator, which builds up a back-pressure within the inlet feed. In effect, the released gas blocks the throat of the inlet to the separator and thus offers resistance to the flow of fluids through the separator. The back pressure build-up in the separator thereby necessitates the use of a more powerful inlet pump, which increases the cost of the separation operation. Perhaps more importantly, this back pressure build up makes the control of the oil-water interface in the oil-water section of the separator more difficult, and can require biasing the control valve at the oil outlet side, with a calibrated spring arrangement since there would not be sufficient oil pressure to overcome the inlet pressure. Also, the release of dissolved gases can disrupt the function of the oil-water section of the separator when expanding gas bubbles reach the vicinity of the oil outlet.

Although the gas build-up problem in the separation of oil-water mixtures has been extant for the past 30 to 40 years, there has not been any significant developments which will eliminate the dissolved gas from the mixture. Heat, chemicals, and the use of low voltage and amperage D.C. current through a grid system, have been improvements made in the conventional wash tank type separator, but the basic separation principles even with these improvements are still the same.

By removing the gaseous vapors and thereafter subjecting the immiscible fluids to centrifugal forces of multiple gravitational amounts, the oil and water components will separate more efficiently. A separator designed in accordance with my present proposal which is used to separate produced oil-water mixtures from oil wells, will produce pipeline quality gas and pipline oil (less than 3 percent water) along with a reasonably clean stream of water which can have additional treatment.

With the use of equipment in accordance with my present invention to separate produced oil-water mixtures in the oil fields, it will be possible to eliminate the use of heat thereby saving fuel cost and making offshore platform operations safer by removing a source of ignition; and also to provide equipment which is much smaller more compact, and less costly.

Accordingly, it is an object of my present invention to provide a means for removing any gaseous components in an immiscible fluids mixture to be separated in a centrifugal separator.

It is also an object of my present invention to provide a centrifugal separator for separating immiscible fluids with means for removing any gases dissolved in the fluids mixture, which minimizes back-pressure build-up and facilitates fluid flow through the separator.

A further object of my invention is to provide a centrifugal separator for separating immiscible fluids, having means for removing entrained solids from fluids.

It is a further object of my present invention to provide a gas trap or separator in conjunction with a two fluid separator, for removing gaseous vapors to reduce the back pressure build up in the inlet feed, which in turn enlarges the scope of the use of the separator to inlet streams which contain substantial amounts of gaseous vapors, and particularly in the use of dehydrating produced oil well production which inherently contain substantial volumes of dissolved gases.

Other objects and a more complete understanding of my present invention will become apparent from the following specification, the appended claims, and the drawings referred to herein.

SUMMARY OF THE INVENTION

The present invention is directed to an improvement in an immiscible fluids separator for removing gas entrained with the fluids mixture, in order to facilitate the flow of the mixture through the separator and to minimize the back-pressure created as the gas is released from th mixture in the separator. Although my separator may be used to separate other immiscible fluids having different densities, the separation operation described herein is the separation of an oil-water mixture.

The centrifugal separator unit includes a gas trap compartment adjacent the feed inlet of the separator and a discharge port for removing the separated gas from the centrifugal separator. A gas containing oil-water mixture is fed to one end of the centrifugal separator and directed outwardly with an impeller. The gas trap is positioned inwardly of the impeller so that the gas is removed prior to the outward movement of the oil-water mixture. Because of its lighter density, gas released from the oil-water mixture, moves into the gas trap through openings in the plate which defines the inlet weir, and is removed from the gas trap through an axial opening.

The degased oil-water mixture is then free to move outwardly and disengage or separate into oil and water layers with the higher density water layer occupying the outer region in the annulus between the imperforate drum or vessel and a perforated inner drum within the vessel, and the lower density oil layer occupying the inner space in the annulus between the imperforate vessel and the perforate inner drum. The imperforate vessel and inner drum is structurally the same as the oil-water separator described in my previously mentioned copending application.

My present invention also includes an internal modification of the oil-water separation section of the centrifugal separator for the entrapment of solids entrained in the oil-water mixtures, which are disengaged in the initial compartment of the oil-water separator. Means for removal of these solids from the separator are provided which include an inverted weir and an external valve positioned in the place where the disengaged solids collect, so that the solids can be removed from the oil-water separator separate from the oil water streams which are separated and removed from the vessel.

DESCRIPTION OF THE PREFERRED EMBODIMENTS

Figure 1:
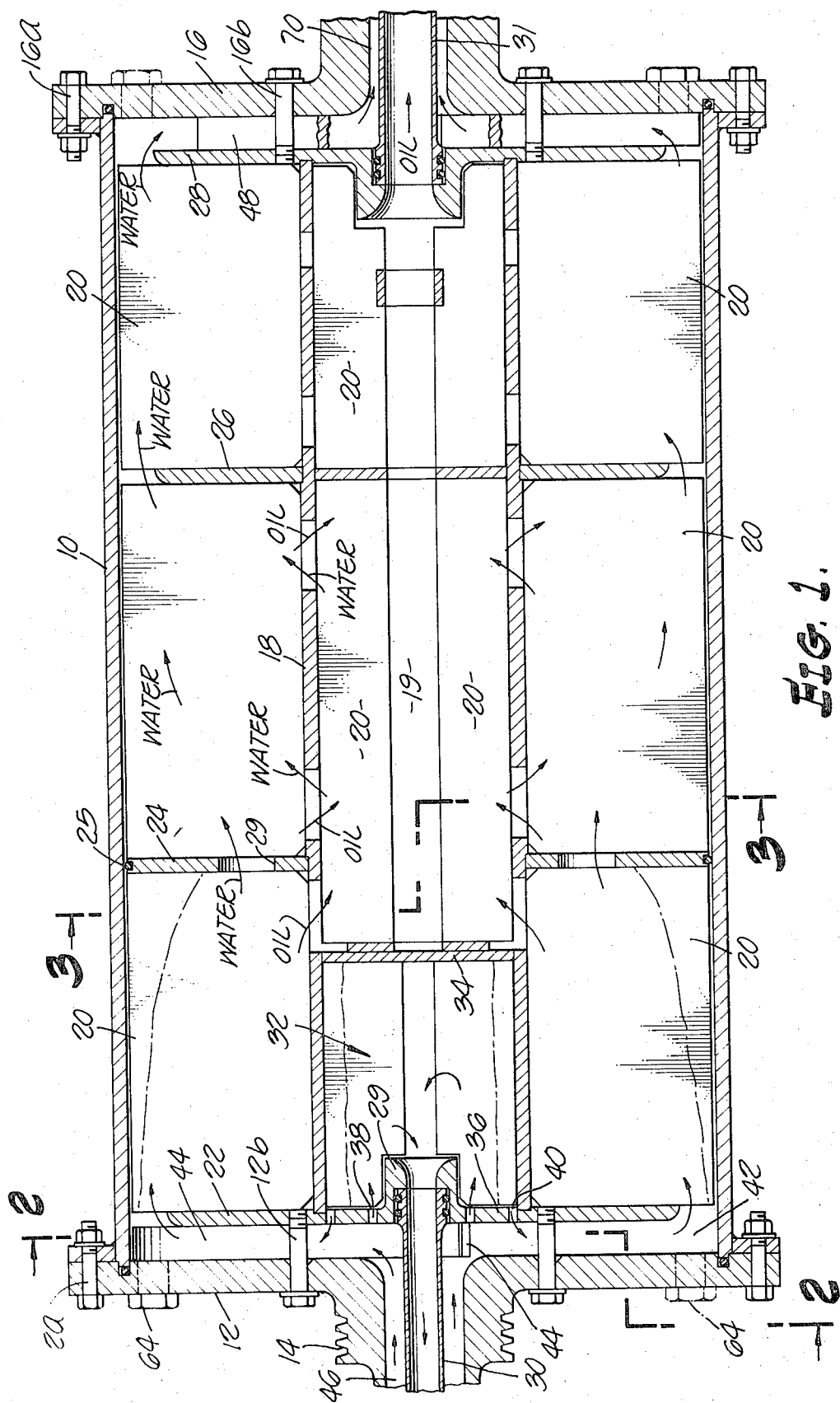
FIG. 1 is a cross-sectional view of a centrifugal separator illustrating one form of the gas separation system proposed in the present invention.

With reference to FIG. 1, the centrifugal separator of my present invention comprises, basically, an imperforate outer drum 10 which is adapted to rotate about its horizontal axis. The drum 10 is formed with inlet housing 12 and outlet housing 16 bolted thereto with bolts 12a and bolts 16a, respectively, in the separator shown in FIG. 1. Of course, the structure of the outer drum may be formed according to any conventional fabrication technique. Any appropriate means may be provided for rotating the separator unit, such as a belt drive arrangements wherein the drive belts engage the drum housing 12 in the V-grooves 14. The rotating drive mechanism forms no part of the present invention and any conventional means known in the art may be employed for this purpose.

Figure 3:
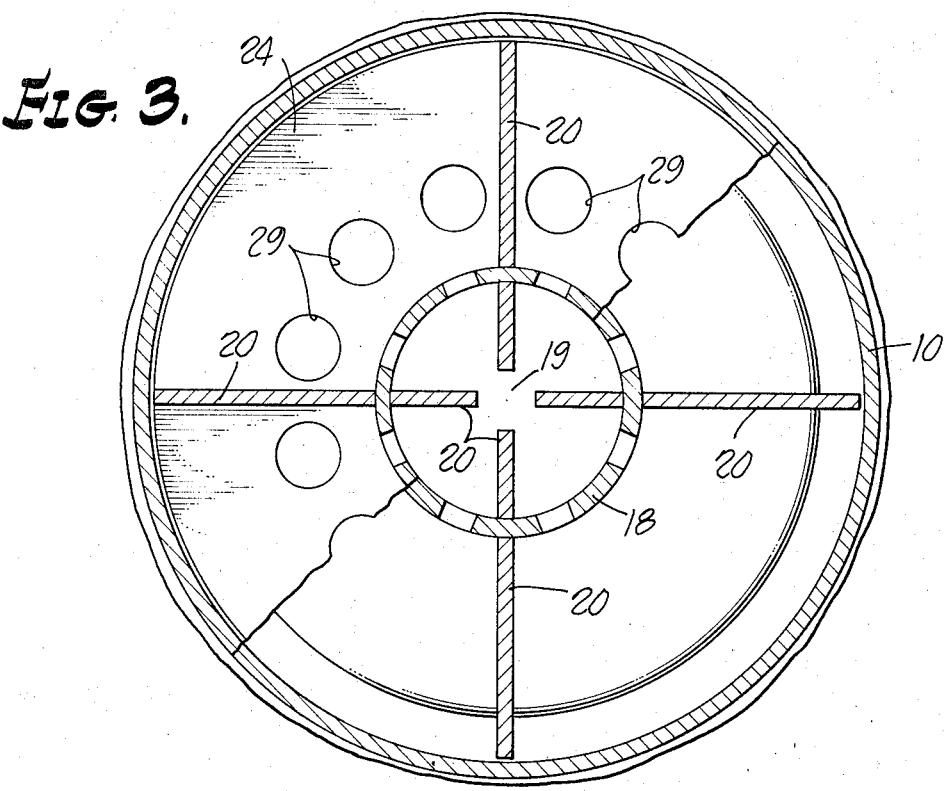
FIG. 3 is a view taken along line 3—3 showing the septa within the centrifugal separator of FIG. 1.

A perforated inner barrel 18 is concentrically disposed within the outer drum 10. The inner barrel 18 is fixed within the drum 10 concentrically by a plurality of radially extending septa 20 (see FIG. 3) which also served to divide the annular space between the outer drum 10 and the inner barrel 18 into annular sectors, as best shown in FIG. 3. The septa 20 may extend from the outer drum to a point proximate the axis of the inner barrel so that the space within the inner barrel is also divided into a plurality of sectors as best shown in FIG. 3. The septa may be sized so as to leave an opening 19 at the center of the inner barrel, to facilitate cleaning of the inside of the inner barrel 18.

Several radially extending weirs are longitudinally spaced in the annulus between the outer drum 10 and the inner barrel 18, in order to facilitate the oil-water separation taking place within the separator. Inlet weir 22, and staging weirs 24 and 26 are structurally affixed to the perforated inner barrel 18. The assemblage of the weirs 22, 24, 26, and 28 is connected to the inlet housing 12 and the outlet housing 16 by a series of bolts 12b and bolts 16b respectively. The weirs 24, 26, and 28 provide a path for the heavier fluids flowing longitudinally through the separator to the discharge end. As shown in FIG. 1 by arrows, the path past weir 24 is provided by a series of circumferentially spaced openings 29 (see FIG. 3) and the path past weirs 22, 26, and 28 is provided by the annular space beyond the outer extremity of these weirs.

The feed inlet to the separator is defined by the annular space 46 between the longitudinally extending portion of the inlet drum housing 12 and a central pipe 30. At the discharge end of the separator, two separate discharge means are provided a first for removing the higher density material (water) which is forced outwardly towards the outer drum of the separator by centrifugal force, and a second for discharging the lower density material (oil) which flows inwardly through the inner barrel 18. A central discharge tube 31 is concentrically disposed within the longitudinally extending portion of the outlet drum housing 16 and defines the two discharge means or paths. The heavier material discharge path 70 being the annulus between discharge tube 31 and the outlet drum housing 16 and the lighter material discharge path being the interior of discharge tube 31.

The gas separation zone of my present invention is defined within the gas separation chamber 32 which is structurally a part of the inner barrel 18 but isolated therefrom by plate 34. The face plate 36 of the gas separation chamber 32 may be the inwardly extending portion of the inlet weir 22. Face plate 36 has series of circumferentially spaced perforations or inlet ports 38 for admitting the gaseous material into the gas separation chamber 32, and another series of circumferentially spaced perforations or discharge ports 40 for returning oil and water from the gas separation chamber to the inlet impeller area 42.

Figure 2:
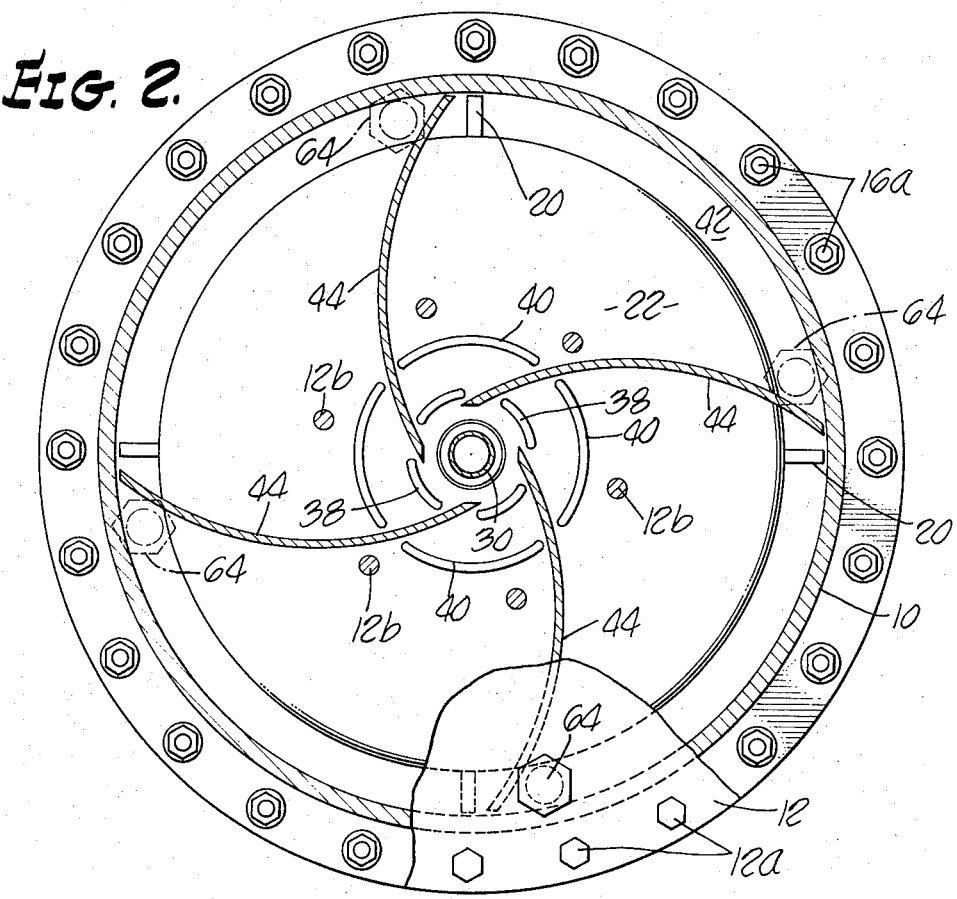
FIG. 2 is a view taken along line 2—2 which shows the impeller section of the centrifugal separator of FIG. 1 in partial cross-section.

The inlet impeller is comprised of a multiplicity of curvilinear vanes 44, extending generally from the inlet annulus 46 outwardly to the outer drum, and positioned normal to the axis of the separator. These impeller vanes which are best shown in FIG. 2, serve to direct the oil-water mixture or emulsion outwardly into the annular space between the outer drum and the inner barrel. A discharge turbine 48 is provided at the outlet end of the separator between the discharge weir 28 and the discharge housing 16 to recover energy imparted to the fluids flowing through the separator.

Figure 4:
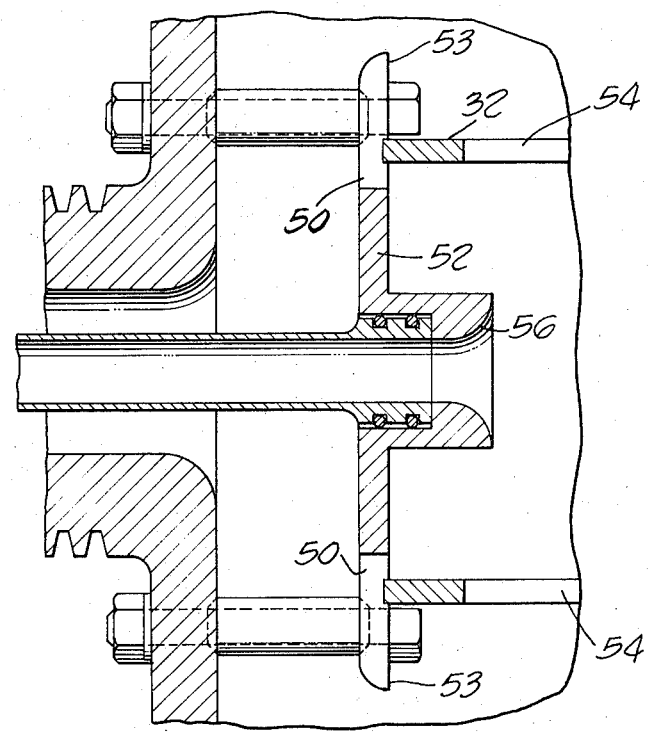
FIG. 4 is a cross-sectional view of a portion of a centrifugal separator having a modified inlet weir and gas separation chamber.

The gas separation zone may be modified as shown in FIG. 4 to provide inlet ports 50 in the face plate 52 of the gas chamber housing and longitudinal slots 54 in the gas separation section 32 of the inner barrel 18, so that the oil and water from which the gas has been separated, may pass outwardly into the annular space between the drum and the inner barrel through slots 54. A gas discharge nozzle 56 is provided for removal of the gas from the separator, and is substantially identical to the gas discharge nozzle 29 shown in the separator of FIG. 1.

In order to develop a pressure difference between the light gases and the relatively heavy liquids in the gas trap area, the gas may pass over a weir or openings in the inlet weir, or end 53 of plate 52 for example.

Figure 5:
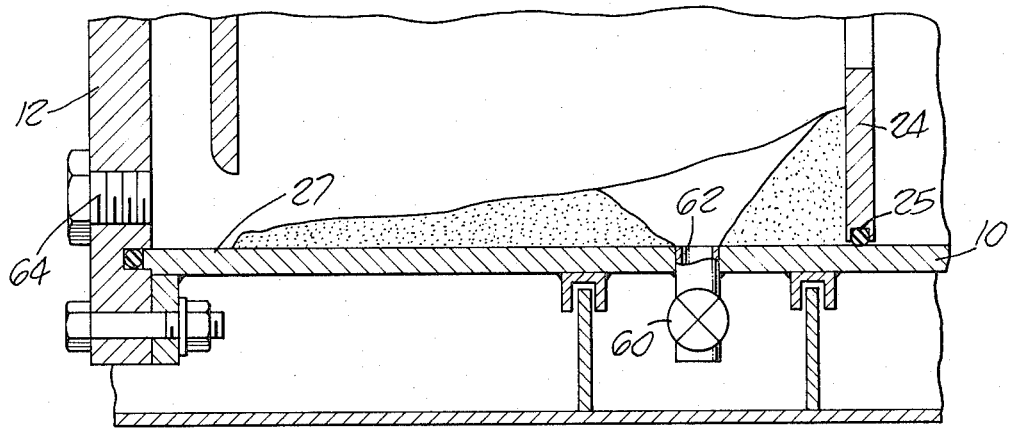
FIG. 5 is an enlarged cross-sectional view of a portion of my centrifugal separator modified to provide for the removal of solids from the oil-water mixture separated in the centrifugal separator.

FIG. 5 shows a modification of the oil-water-gas separator shown in FIG. 1, wherein means are provided for removal of solids entrained in the oil-water emulsion or mixutre being separated. In this apparatus, solids are thrown by centrifugal force to the outer drum 10 and collect near the first weir 24 sealed at outer shell 10 by O ring 25. The solids tend to be carried towards the weir by the force of the water flowing longitudinally through the separator, but are deposited in inner face 27 of outer drum 10. A valve 60 is provided at opening 62 in the outer drum and may be periodically opened to permit removal of the solids accumulated in the separator adjacent the first weir 24. A plurality of clean out plugs 64 are provided in the housing plate 12 to provide additional access to the interior of the drum adjacent the location where the solids accumulate.

During operation of my separator, the oil-water-gas mixture flows through the inlet annulus 46 of FIG. 1 to the inlet weir 22 where the mixture is directed outwardly by the impeller vanes 44. As the mixture is directed outwardly by the vanes 44, the oil and water enter the annular section between the drum 10 and the inner barrel 18 and the oil and water disengage and form three layers, the oil layer being lighter and gravitating inwardly with the water layer being heavier occupies the outer region of the annulus. The third layer is the oil-water emulsion which is separated as the mixture passes through the separator. The flow of the various layers and particles is indicated by the directional arrows shown in FIG. 1. As the oil-water mixture is directed outwardly by the impeller vanes 44, the dissolved gases are released from the oil-water mixture and because of their low specific gravity, these gases flow into the gas separation zone 32 through ports 38. Any oil and water carried into the gas separation zone is forced outwardly against the outer wall of the gas separation zone 32 and flows through ports 40 outwardly to the oil-water separation annulus through the impeller vanes 44. The gas collected in the gas separation zone 32 is removed from the separator through nozzle 29 and pipe 30 which is provided with a suitable external pressure control means (not shown) for controlling the liquid-gas level within the gas separation zone.

The separation of oil and water is enhanced by the staging effect, that is the compartmentalization of the separator by the interior weirs 24 and 26. Since the water is forced inwardly around the weir 24, (solids are left behind on wall of the drum 10 as shown in FIG. 10, and) the oil layer flows into the interior of the separator through perforations in the barrel 18. Centrifugal force causes any water remaining in the inner oil layer to flow outwardly towards the water layer. The water flow proceeds longitudinally and outwardly around the weir 26 into the final annular compartment and is discharged over the discharge weir 28 through annulus 70. Separated oil is removed from the separator through the oil discharge tube 31.

The discharge turbine 48 permits recovery of energy from the fluid flowing through the separator. The energy of course, is imparted to the fluid by an inlet pump (not shown) and may be used to help rotate the separator.

While my invention has been described above with a certain degree of particularity and with reference to certain details in order to describe a specific embodiment of my invention, it is to be understood that the scope of my claims should not be limited thereby but rather is to be afforded the entire breadth of the appended claims.

I claim:
1. A centrifugal separator for treating a fluid mixture having a higher density fluid, a lower density fluid and a gaseous component therein, comprising in combination:
   a rotable drum having a perforated inner barrel concentrically disposed therein,
   inlet means for feeding said fluid mixture into said drum near the axis of rotation at one end of said drum,
   means adjacent said inlet means for removing gas from said mixture,
   impeller means within said drum proximate said inlet means for directing the degased fluid mixture outwardly into the annular space between said drum and said inner barrel where said higher density fluid separates from said lower density fluid,
   means for recovering said separated fluids from said drum.

2. The centrifugal separator of claim 1 including discharge turbine means adjacent the end of said drum opposite said inlet means for recovering energy from said separated higher density fluid.

3. The centrifugal separator of claim 1, wherein said gas removing means comprises a second inner barrel concentrically disposed within said drum with an end opening therein for admission of said gaseous components:
   an axial discharge outlet in said second barrel for said gaseous components, and
   a discharge opening in said second barrel for discharging said fluid mixture from said second barrel into said annular space.

4. The apparatus of claim 3, wherein said gas discharge outlet is concentrically disposed within said feed inlet means.

5. The apparatus of claim 3, including a pressure regulator on said gas discharge line for controlling the gas-fluid inter-face level within said gas removing means.

6. The apparatus of claim 3, wherein said discharge opening in said second barrel for the passage of said fluids to said annular space is in the inlet end of said second barrel.

7. The apparatus of claim 3, wherein said second barrel has side openings therein for passage of said higher and lower density fluids to said annular space.

8. The apparatus of claim 3, including a multiplicity of longitudinally spaced weirs in said annular space, said weirs having means for passage of said higher density fluid longitudinally through said annular space toward the discharge end of said separator.

9. The separator of claim 1 including means for recovering solids entraining in said fluid mixture.

10. A centrifugal separator for treating a fluid mixture having a higher density fluid, a lower density fluid and a gaseous component therein, comprising in combination:
   a rotable drum having a perforated inner barrel concentrically disposed therein,
   inlet means for feeding said fluid mixture into said drum near the axis of rotation at one end of said drum,
   means adjacent said inlet means for receiving gases contained in said mixture into said inner barrel,
   means for discharging said gaseous component separated from said fluid mixture in said gas receiving means, means for releasing degased fluids from said gas receiving means, impeller means within said drum proximate said inlet means for directing the degased oil-water mixture outwardly into the annular space between said drum and said inner barrel where said higher density fluid separates from said lower density fluid, means at the opposite end of said separator from said inlet means, for recovering said separated higher density fluid from said drum, and said lower density fluid from said inner barrel, and means for isolating said gas receiving means of said inner barrel from said higher density fluid recovering means of said inner barrel.

11. A method for separating a fluid mixture having therein a higher density fluid, a lower density fluid, and a gas, in a separator comprising a rotatable drum having an inner barrel concentrically disposed within said drum, inlet and outlet means at opposite ends of said drum, and a gas separation chamber adjacent said inlet end of said drum, comprising the steps:

a. feeding said mixture into said inlet end of said drum so that the gas in said mixture flows into said gas separation chamber to separate from said fluid mixture, b. removing said higher and lower density fluids passing into said chamber with said gas, from said chamber into the annular space between said drum and said barrel after said fluids have separated from said gas in said chamber, c. removing said separated gas from said chamber through gas discharge means, d. controlling the gas-fluid inter-face level in said chamber with a pressure regulator on said gas discharge means, e. separating said degased higher and lower density fluids in said separator, and f. recovering said separated fluids at said discharge end of said drum.

* * * * *